Sept. 2, 1947.  A. V. D. WILLGOOS  2,426,878
RADIAL AIRCRAFT ENGINE
Filed Nov. 17, 1944  3 Sheets-Sheet 2

Inventor
Andrew V. D. Willgoos
by Charles C. Chilton
Attorney

Sept. 2, 1947.  A. V. D. WILLGOOS  2,426,878
RADIAL AIRCRAFT ENGINE
Filed Nov. 17, 1944  3 Sheets-Sheet 3

Patented Sept. 2, 1947

2,426,878

UNITED STATES PATENT OFFICE 2,426,878

RADIAL AIRCRAFT ENGINE

Andrew V. D. Willgoos, West Hartford, Conn., assignor to United Aircraft Corporation, East Hartford, Conn., a corporation of Connecticut Application November 17, 1944, Serial No. 563,880

11 Claims. (Cl. 123—195)

This invention relates to multi-row radial aircraft engines.

An object of this invention is to provide improvements in rear sections for radial aircraft engines.

Another object of this invention is to provide a novel and improved combination and arrangement of engine auxiliaries and accessories providing a compact and efficient rear section for a radial aircraft engine, particularly for a four row radial engine having seven cylinders in each row.

A further object of this invention is to provide a rear section for a multi-row radial engine which may be readily altered merely by interchanging parts to form a large number of different engine types with a minimum number of parts.

A still further object is to provide an aircraft engine rear section having a circumferential row of accessories mounted radially thereon, to provide maximum accessibility to the accessories when the engine is installed in an aircraft.

Other objects and advantages will be apparent from the specification and claims, and from the accompanying drawing which illustrates what is now considered to be a preferred embodiment of the invention.

One of the problems of the aircraft engine manufacturer is to provide a large number of different engine types to satisfy the widely varying requirements of the aircraft designer, to meet differing conditions resulting from differences in aircraft types, mode of operation, and individual preferences of the aircraft manufacturer or designer; yet it is obviously not economically feasible to provide a custom built engine for each aircraft installation. According to this invention, a wide variety of engine types may be provided by the mass production of a minimum number of parts, which are combined and arranged in a novel manner to form a compact, lightweight and efficient rear section, providing maximum accessibility to the various accessories when installed in the aircraft, composed of parts that may be readily interchanged to form different engine types having different operational and structural advantages.

Figure 1:
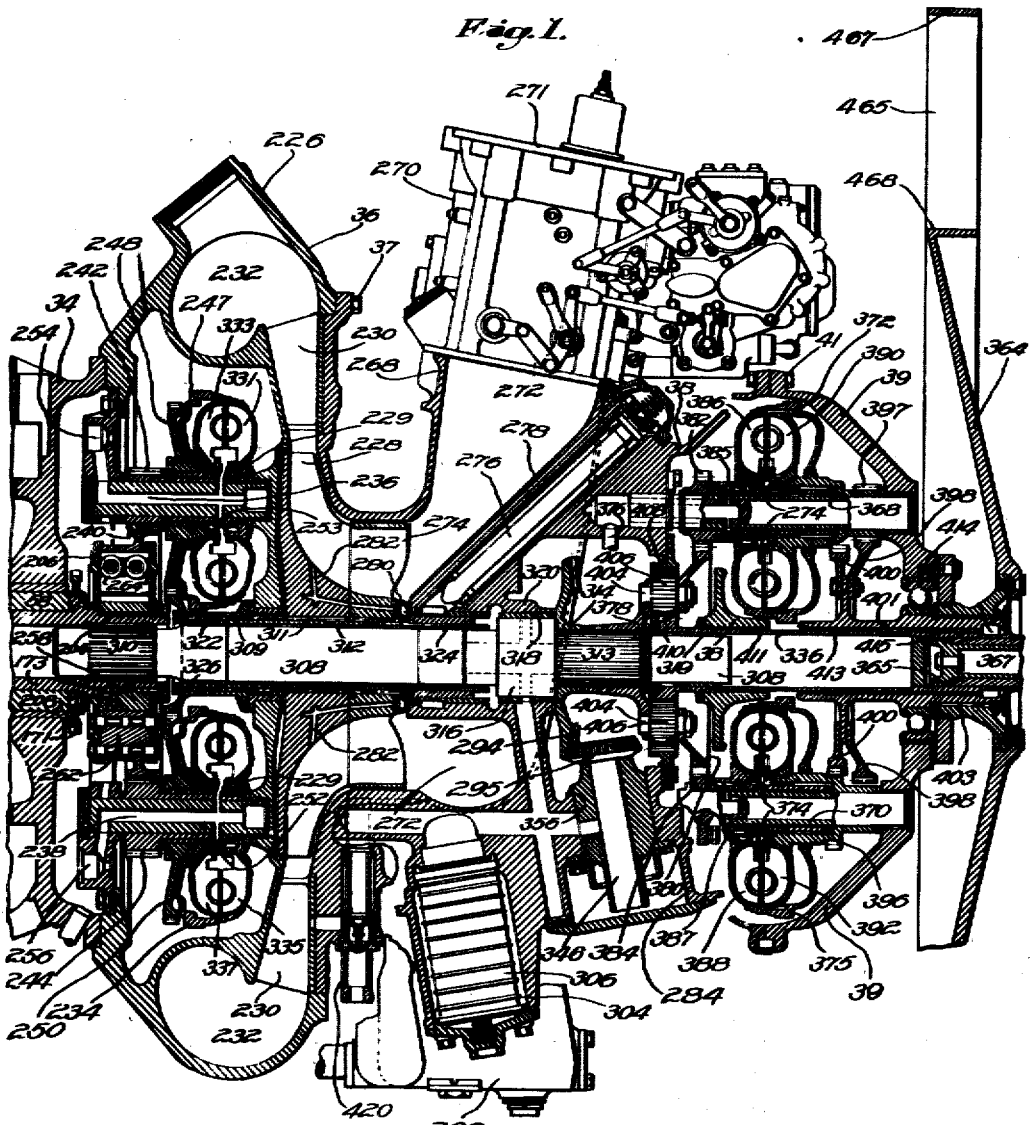
Fig. 1 is a longitudinal section through a rear section, constructed according to this invention, for a radial aircraft engine.

Referring to the drawing, Fig. 1, blower case 36 is a magnesium casting attached to the rear of the engine crankcase (a portion of which is shown at 34) and which houses the impeller 228 and a vaned diffuser 230. Collector ring 232 around the periphery of the blower case receives the fuel and air mixture from the diffuser and distributes it uniformly among seven equally circumferentially spaced blower outlet ports, one of which is shown at 226, from which it is uniformly distributed among the cylinders of each bank by intake manifolds (not shown). Reference is made to the Hobbs-Willgoos application Serial No. 552,372 for a detailed disclosure of the crankcase 34, intake manifolds, and other parts of an engine with which this invention is particularly adapted for use. As will be understood from the Hobbs-Willgoos application, the rear section of the subject invention may be flown in either the forward or aft position with respect to the direction of flight; hence the terms "front" and "rear" are used herein merely to describe the relative position of the parts, regardless of the position of the engine with respect to the direction of flight.

The drive for the impeller 228 is contained in the front portion of the blower case 36 and comprises two high speed fluid couplings (one of which is shown at 247) and two low speed fluid couplings (one of which is shown at 234). These couplings are mounted on shafts 236, 238 supported by walls of the blower case and which are hollow to admit working fluid, preferably engine oil, to the couplings for the purpose of controlling the slip thereof to vary the speed of the impeller relative to the engine. The driving sides 331, 335 of the couplings are driven by the engine crankshaft 58, which is rotatably supported by the rear main bearing 208, through a spring drive and hydraulic damper unit 206, which is splined at 204 to a quill 173 fixed within the crankshaft, and which has a gear 240 around its periphery meshing with the coupling drive pinions 242 and 244. Each pinion is carried by a shaft splined to one of the coupling driving members at 229. The driven sides 333, 337 of the couplings are connected to impeller drive pinion 326 on the impeller shaft 312 by gears 248 and 250. Low speed coupling 234 contains a ring cut off valve 252 which acts in conjunction with a control valve (not shown) in the manner disclosed and claimed in the Hobbs-Willgoos application Serial No. 492,423, to shift the drive between the low speed coupling and the high speed coupling as the speed of the impeller is varied throughout its range of speeds relative to the engine. High speed coupling 247 has a continuously open ring spacer 253 instead of a ring inlet valve. The control valve which regulates the flow of working fluid to the couplings may have its two ports respectively connected by conduits with the inlet ports 254, 256 of the hollow shafts 236, 238. As disclosed in application Serial No. 492,423, working fluid is constantly drained from the couplings in a relatively small amount through restricted openings, and the slip of the driving couplings is controlled by varying the inlet flow relative to the outlet flow to vary their filling or liquid content.

Figure 2:
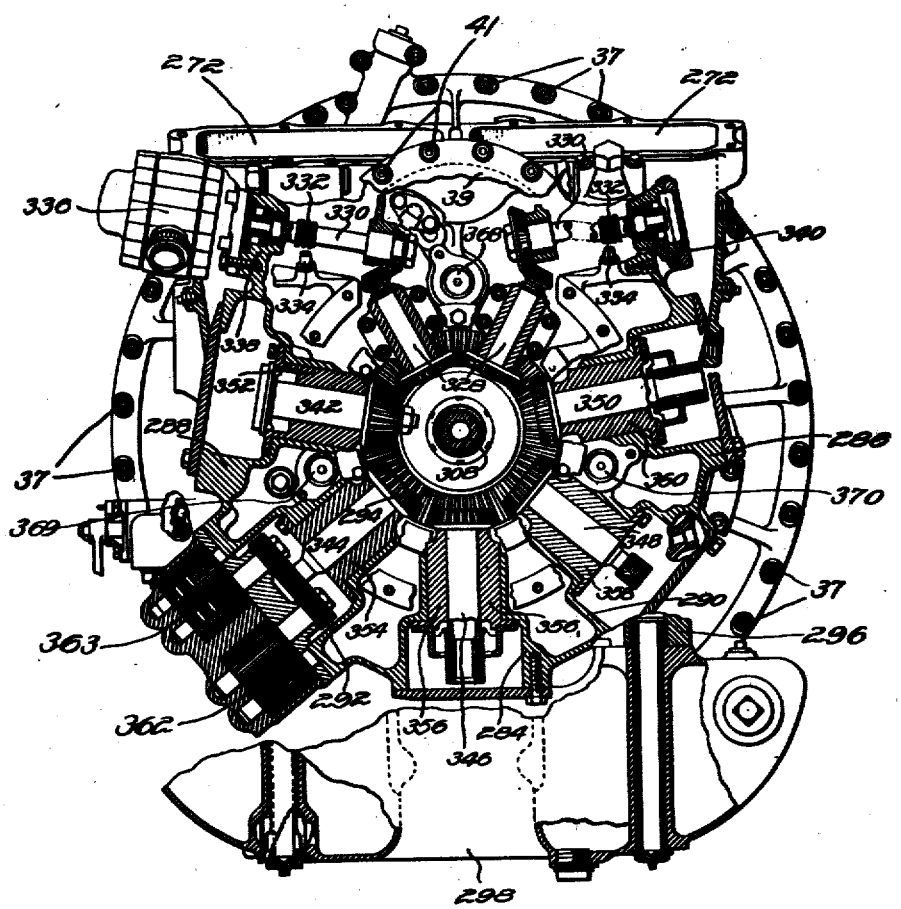
Fig. 2 is a transverse section looking toward the front, taken immediately to the rear of the main accessory drive gear of Fig. 1. Certain parts have been broken away or slightly displaced from their true position in order to simplify the drawing.
Figure 3:
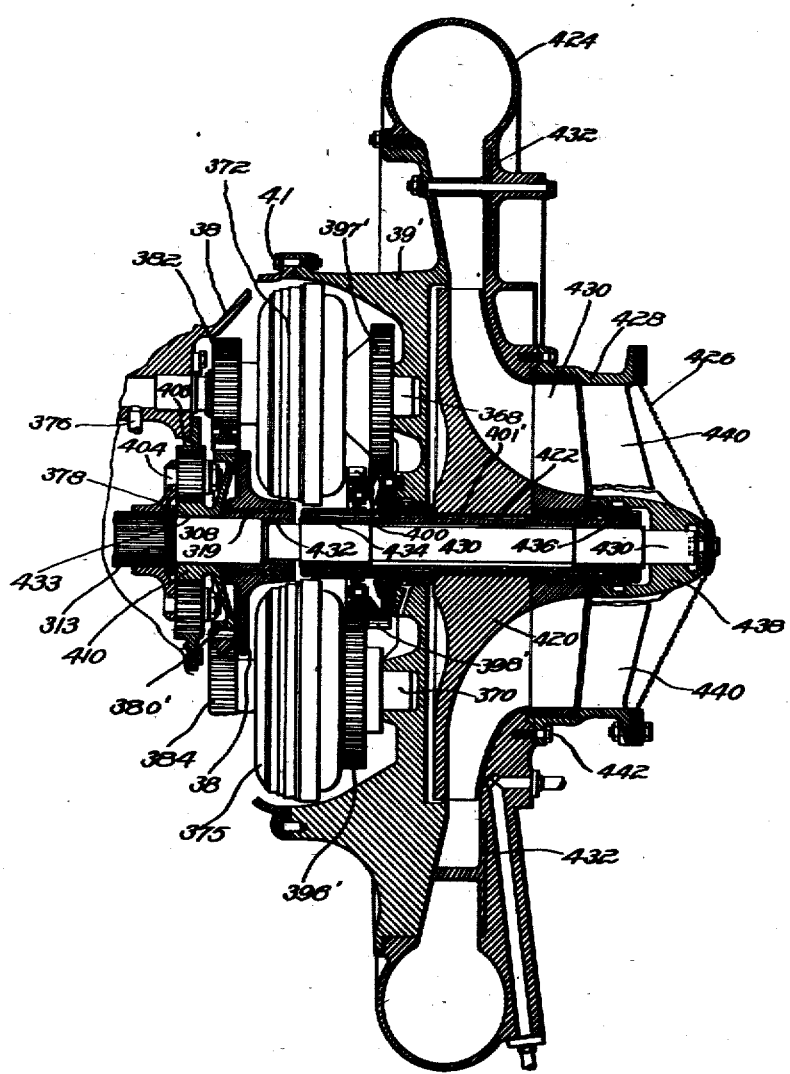
Fig. 3 is a longitudinal view showing a portion of the rear section of Fig. 1 as modified to provide an auxiliary supercharger stage in place of the cooling blower shown in Fig. 1.

In the embodiment shown in Figs. 1 and 2, only one supercharger stage is provided, driven at a controllable gradually variable speed ratio relative to engine speed by means of the fluid couplings 232, 234. Where an auxiliary supercharger stage is provided, as shown in Fig. 3, main stage impeller 228 may be driven through a conventional gear reduction drive at a fixed speed ratio relative to engine speed, rather than by the couplings 234, 247.

Spring drive and hydraulic damper unit 206 comprises a spider member 258 splined to the quill 173 fixed to crankshaft 58 and having outwardly projecting radial vanes which are interposed between the inwardly projecting radial vanes 262 fixed to the gear 240, as more fully shown in Hobbs-Willgoos application Serial No. 552,372. The drive is transmitted from the spider vanes through coil springs 264 to the gear vanes 262. The space between the outwardly and inwardly projecting vanes is maintained full of viscous fluid such as engine oil and certain of the vanes have restricted openings therethrough, thereby hydraulically damping torsional vibrations, which cause the vanes to move toward and away from each other. Thus, the crankshaft 58 is flexibly connected to the fluid couplings and impeller and torsional vibrations of the crankshaft are damped by the drive unit 206.

Accessory drive housing 38 is a magnesium alloy casting bolted at 37 to the blower case and having a flange 268 on its upper side to provide a mounting surface for a down draft carburetor 270, of a conventional pressure injection type. Air passing through the carburetor is admitted to the rotating inducer 274 and impeller 228 by intake passage 272. A fuel feed valve 276 mounted in a web or boss 278 discharges fuel, as metered and proportioned to airflow by the carburetor, into the spinner cup 280 which is carried by and rotates with the impeller 228. The fuel is maintained in an annular bed within the cup by centrifugal force and is discharged from this bed into the airstream passing through the impeller by passages or discharge nozzles 282. Discharge nozzle 276 acts in a known manner to shut off the flow of fuel except when the fuel pressure is above a predetermined minimum. Excess fuel is drained from passage 272 when the engine is not running by a fuel drain valve 420.

The outer wall of the accessory drive housing is provided with mounting pads, 283, 286, 288, 290, 292, (Fig. 2), which serve as supports for the accessories and their drives. The accessory drive shafts 328, 342, 344, 346, 348, 350, are positioned radially and are driven through bevel pinions 295 by a single bevel accessory drive gear 294. Two additional mounting pads, one of which is shown at 296, are provided for the main oil sump 298. An oil pressure chamber 304 (Fig. 1) containing two concentric cylindrical oil screens the outer of which is shown at 306 is located in the bottom central portion of the accessory drive housing.

An accessory drive shaft 308, which is splined within the quill 173 at 310, extends through the blower and accessory sections, passing through the hollow impeller shaft 312. Shaft 308 is splined at 313 to the hub 314 of the main accessory drive gear 294, and is supported at its enlarged portion 316 by a steel backed bronze bearing 318 mounted in a cylindrical boss 320 in the accessory drive housing. The rear end of the accessory drive shaft is supported by a bearing 319 in the front end of the power take-off shaft 336, 367.

Impeller shaft 312 is supported internally on two steel backed bronze bearings 322, 324 by the accessory drive shaft 308. Impeller 228 is splined and shrunk on impeller shaft 312 at 311, making a semi-permanent assembly. Spur pinion 326 is also splined on the front end of the impeller shaft, at 309.

Two tachometer drives 328, 330, 332 and 334, are provided (Fig. 2), one on the left and one on the right side of the accessory drive housing. These drives are supported by the walls of the housing and incorporate integral spiral gears (not shown) which are driven by the spiral gears 332 on the shafts 330. A supercharger or pump 336 for the ignition system may be mounted on the pad 338 and driven by the left hand shaft 330 while a fuel pump (not shown) may be mounted on the pad 340 and driven by the right-hand shaft 330.

The radial accessory shafts are mounted in bushings 352, 354, 356, 358, 360 (Fig. 2), which are interchangeable among the various accessory mounting pads. The outer diameter of each bushing is greater than the maximum diameter of the corresponding pinion so that each radial shaft, gear, and bushing may be readily removed as a unit from its mounting pad. Thus the accessories may be interchanged so that they may be supported and driven in any one of a large number of various positions and arrangements around the accessory drive housing. For an example of one such arrangement, a generator may be mounted on the pad 286, a vacuum or hydraulic pump may be mounted on the pad 290, a second generator may be mounted on the pad 284 and a starter may be mounted on the pad 288. The pad 292 is specially designed to support a pressure oil pump 362 and a three-stage scavenge pump 363. With this accessory arrangement, access to any and all of the accessories may be readily had when the engine is installed in an aircraft merely by removing an annular cowl strip at the location of the accessory row.

By arranging the accessories circumferentially around the periphery of the accessory drive housing the rear face of the housing is left free and is utilized to support interchangeably a drive for an engine cooling fan or a drive for an auxiliary supercharger stage. As shown in Fig. 1, the auxiliary drive housing 39, which is bolted at 41 to the accessory housing 38, contains a fluid drive for an engine cooling fan 364 having turbine type blades 465 between the ring shrouds 467, 468 and also contains a fixed ratio drive for the power take off shafts 336, 367, which are splined together at 365.

The fluid drive for the fan comprises three fluid couplings mounted on shafts 368, 369, 370 (Fig. 2) two of which are shown in the plane of the view in Fig. 1. Mounted on the shaft 368 is a low speed fluid coupling 372 and mounted on the shaft 370 is a high speed coupling 375. The couplings are driven from the accessory shaft 308 by a cage 378 splined to the shaft 308 at 313 and having a gear 380 thereon meshing with pinions 382 and 384 respectively splined at 385, 387 to the driving members 386 and 388 of the low and high speed couplings. Driven members 390 and 392 of the couplings are fixed to pinions 397, 396, which mesh respectively with gears 398, 400 on the fan drive shaft 401. A second high speed coupling (not shown) is mounted and driven in like manner on shaft 369, so that the load is divided between two couplings when the fan is being driven in its high speed range. The low speed coupling is provided with a cut off inlet ring valve 374 and the couplings are fed through passages within the shafts 368, 369, and 370. Oil may be admitted to the shafts by conduits, one of which is shown at 376, to drive the fan by the engine at a continuously variable speed ratio through either the low speed coupling or the two high speed couplings, in a manner explained in the Hobbs-Willgoos application Serial No. 492,423.

Cage 378 also supports a plurality of shafts 404 on which are rotatably mounted pinions 406 meshing with a fixed gear 408 secured to the accessory casing and with a sun gear 410 on the power take off shaft 336. The fan shaft 401 and the power take off shaft 336 rotate relative to each other on bearings 413, 415. They are supported at the rear from the case 39 by a ball bearing 414, and the front end of shaft 336 is supported from case 38 by a sleeve bearing 411. With this arrangement, accessory shaft 308 drives the cage 378 and the coupling drive gear 380 at accessory shaft speed. It also carries the pinions 406 around the fixed gear 408 and thus causes the sun gear 410 to be driven at a predetermined different speed relative to the speed of the accessory shaft 308, dependent upon the ratio of the planetary gear. Fan speed may be gradually varied relative to the speed of the engine by varying the filling of the coupling 372 or the coupling 375, dependent upon which is driving. The power take off shaft 336, 367, which is driven at a predetermined fixed speed ratio relative to the engine, may be utilized for driving an auxiliary supercharger stage, which may be mounted remotely from the engine, a second propeller, a second fan, a large electrical generator, or for similar purposes.

The rear section of this invention readily lends itself to the formation of different engine types with a minimum number of parts. Thus, fan 364 may be omitted and the fluid couplings 372, 374 utilized to drive an auxiliary blower stage at a continuously variable speed ratio. This can be readily done as shown in the modification of Fig. 3, simply by omitting the power take off shaft 336, 367 shown in Figs. 1 and 2 and directly connecting the coupling drive gear 380' to the sun gear 410, instead of to the cage 378, thus providing by a very simple change in the gearing a speed increasing gear train suitable for a blower drive. When such a change is made the auxiliary supercharger impeller 420 is splined at 422 to the drive shaft 401' and an auxiliary supercharger casing 39' replaces the fan casing 39. When an auxiliary supercharger stage is provided as shown in Fig. 3, the main stage 36 can be driven either through the fluid couplings 247, 234 at a continuously variable speed, thus providing two stages each having continuously variable speed ratios; or it can be driven by a speed increasing gear drive of fixed ratio, thus providing two stages, one of fixed ratio and the other of variable ratio.

Where an auxiliary supercharger stage (Fig. 3) replaces the fan drive of Fig. 1, the collector ring 424 is connected by an interstage duct (not shown) to the flange 271 of the carburetor 270. Free stream air is admitted by an intake duct (not shown) to inlet of the auxiliary stage and flows to the engine through screen 426, fixed housing 428, rotating inducer 430 and impeller 420, diffuser 432, collector 424, and then through interstage ducting through the carburetor to the inlet passage 272 of the main supercharger stage.

Auxiliary impeller 420 is splined to a shaft 401' rotatably supported on bearings 434, 436 by a stationary shaft 430 having its front end terminating adjacent accessory drive shaft 308 and supported by a sleeve 432 in the bearing 319' carried by the bearing 319 in the casing 38. The rear end of shaft 430 is keyed to and supported by a streamlined cap 438 carried by the inner ends of the radial vanes 440 of the fixed housing 428, which is bolted at 442 to the casing 39'.

It is to be understood that the invention is not limited to the specific embodiment herein illustrated and described, but may be used in other ways without departure from its spirit as defined by the following claims.

I claim:

1. A rear section for an aircraft engine comprising, an engine driven drive shaft, a pair of longitudinally spaced gear transmissions connected to said shaft, and a circumferential row of engine accessories drivingly connected with said shaft between said transmissions.

2. A rear section for an aircraft engine comprising, an engine driven drive shaft, a pair of longitudinally spaced fluid transmissions connected to said shaft, and a circumferential row of engine accessories drivingly connected with said shaft between said transmissions.

3. In a radial engine having a generally cylindrical accessory casing, means for mounting a plurality of engine accessories in a row around the circumference of said casing, an auxiliary drive casing mounted on the rear face of said accessory casing, and means within said casing adapted to drive a blower supported coaxially with respect to said accessory casing.

4. In a radial engine having an accessory casing, means for mounting a plurality of engine accessories in a row around the circumference of said casing, an auxiliary drive casing mounted on the rear face of said accessory casing, and a fluid transmission within said casing adapted to drive a blower supported by said accessory casing.

5. In a radial engine having a crankcase and a crankshaft, a blower casing attached to said crankcase, an accessory casing attached to said blower, an auxiliary drive casing attached to said accessory casing, a drive shaft connected to said crankshaft and extending through said blower and accessory casings, a pair of concentric shafts extending through said auxiliary drive casing and coaxially with said drive shaft, and mechanism for driving each of said concentric shafts by said drive shaft comprising, a planetary gear train having a cage connected to said drive shaft and to one of said concentric shafts and having a sun gear meshing with planet gears on said cage and connected to the other of said concentric shafts.

6. In a rear section for a radial engine having a crankshaft, a first blower, a second blower coaxial with and spaced from said first blower, a first fluid coupling connected to said first blower, a spring drive hydraulically damped unit connected with said first coupling and said crankshaft for driving said first blower by said crankshaft, a second fluid coupling connected with said second blower, and an elongated torsionally flexible shaft extending through said first blower and connected with said crankshaft and said second coupling for driving said second blower by said crankshaft.

7. The combination of claim 6, including an accessory housing interposed between said blowers.

8. In a rear section for a radial aircraft engine, a generally cylindrical accessory casing having annular front and rear mounting faces lying in planes substantially transverse to the axis of said casing, a row of engine accessory mounting pads spaced around the circumference of said casing, a blower casing mounted on the front mounting face of said accessory casing, and an auxiliary drive mechanism mounted on the rear mounting face of said accessory casing.

9. In an aircraft engine having a crankshaft, an accessory section having means thereon for mounting a plurality of engine accessories in a row around said accessory section, a blower section located inboard of said accessory section between said accessory section and said crankshaft, and power transmitting means extending through said blower and accessory sections for connecting said crankshaft with a blower located outboard of said accessory section.

10. The combination of claim 9, including a pair of transmissions positioned inboard and outboard of said accessory section for connecting said power transmitting means with a blower in said blower section and with said outboard blower, respectively, and a blower air intake duct located between said transmissions.

11. In an aircraft engine having a crankshaft, a transmission, an accessory section having means thereon for mounting a plurality of engine accessories in a row around said accessory section, said accessory section being positioned between said transmission and said crankshaft, and power transmitting means extending through said accessory section and connecting said crankshaft with said transmission.

ANDREW V. D. WILLGOOS.

REFERENCES CITED

The following references are of record in the file of this patent:

UNITED STATES PATENTS

| Number | Name | Date |
| --- | --- | --- |
| 2,290,884 | Kollmann | July 28, 1942 |
| 2,027,819 | Gregg | Jan. 14, 1936 |
| 2,172,100 | Hoffman et al. | Sept. 5, 1939 |